(12) United States Patent
Kim

(10) Patent No.: US 9,312,584 B2
(45) Date of Patent: Apr. 12, 2016

(54) EMERGENCY STARTING SYSTEM AND METHOD FOR FUEL CELL HYBRID VEHICLE

(71) Applicant: Hyundai Motor Company, Seoul (KR)

(72) Inventor: Sungdo Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 130 days.

(21) Appl. No.: 14/091,160

(22) Filed: Nov. 26, 2013

(65) Prior Publication Data

US 2014/0175806 A1    Jun. 26, 2014

(30) Foreign Application Priority Data

Dec. 21, 2012  (KR) .......................... 10-2012-0151280

(51) Int. Cl.
 *H02P 9/04* (2006.01)
 *H01M 16/00* (2006.01)
 *F02N 11/08* (2006.01)

(52) U.S. Cl.
 CPC ......... *H01M 16/003* (2013.01); *F02N 11/0866* (2013.01); *F02N 2011/0885* (2013.01)

(58) Field of Classification Search
 CPC .................... H01M 16/003; F02N 2011/0885; F02N 11/0866

USPC .... 290/40 C, 40 B, 40 F, 38 R; 419/9, 61, 20; 307/10.1; 320/109

See application file for complete search history.

(56) References Cited

U.S. PATENT DOCUMENTS

| | | | |
|---|---|---|---|
| 2006/0097577 A1* | 5/2006 | Kato et al. | 307/10.1 |
| 2009/0033294 A1* | 2/2009 | Odajima et al. | 320/166 |
| 2011/0133694 A1* | 6/2011 | Song | 320/109 |
| 2011/0248687 A1* | 10/2011 | Kamioka et al. | 322/60 |

\* cited by examiner

*Primary Examiner* — Julio Gonzalez Ramirez
(74) *Attorney, Agent, or Firm* — McDermott Will & Emery LLP

(57) ABSTRACT

An emergency starting system and an emergency starting method of a fuel cell hybrid vehicle perform an emergency start when a DC power converter for starting fails. The emergency starting system includes: a fuel cell and a super capacitor connected through a main bus terminal in parallel; a driving inverter connected to the main bus terminal; a driving motor connected to the driving inverter; a balance-of-plant configured to activate the fuel cell; a starting DC power converter configured to drive the balance-of-plant; and a starting controller configured to control the super capacitor at the time of a start. The starting controller includes a super capacitor relay, an initial charging relay, and an initial charging resistor, the initial charging relay includes a plurality of relays, and the initial charging resistor includes a plurality of resistors.

4 Claims, 3 Drawing Sheets

EMERGENCY STARTING SYSTEM AND METHOD FOR FUEL CELL HYBRID VEHICLE

CROSS-REFERENCE TO RELATED APPLICATION

This application claims priority to and the benefit of Korean Patent Application No. 10-2012-0151280 filed in the Korean Intellectual Property Office on Dec. 21, 2012, the entire contents of which are incorporated herein by reference.

FIELD OF THE INVENTION

The present disclosure relates to an emergency starting system and an emergency starting method of a fuel cell hybrid vehicle, and more particularly, to an emergency starting system and an emergency starting method of a fuel cell hybrid vehicle, which is capable of performing an emergency start when a DC power converter for starting fails.

BACKGROUND

A fuel cell hybrid vehicle, which is one of the environmentally-friendly future vehicles, travels by continuously outputting constant power by a fuel cell, and employs an operation mode of auxiliarily outputting the insufficient portion of power from a super capacitor or a high voltage battery when power is insufficient.

When the fuel cell hybrid vehicle starts, the fuel cell is activated by boosting a voltage by using a DC power converter for starting to drive a balance-of-plant (BOP). The DC power converter for starting operates only at the time of the starting, but is not operating after the start. Many circuits, components, and the like for controlling a vehicle are mounted inside the vehicle, so that the circuits and the components may fail due to the increase in hours of use, accidents, or the like. However, even when the DC power converter for starting used only at the time of the start fails, it is necessary to tow the vehicle and replace the failed components.

The above information disclosed in this Background section is only for enhancement of understanding of the background of the inventive concept and therefore it may contain information that does not form the prior art that is already known in this country to a person of ordinary skill in the art.

SUMMARY

The present disclosure has been made in an effort to provide an emergency starting system and an emergency starting method of a fuel cell hybrid vehicle, which is capable of performing an emergency start when a starting DC power converter fails.

An exemplary embodiment provides an emergency starting system of a fuel cell hybrid vehicle, including: a fuel cell and a super capacitor connected through a main bus terminal in parallel; a driving inverter connected to the main bus terminal; a driving motor connected to the driving inverter; a balance-of-plant configured to activate the fuel cell; a starting DC power converter configured to drive the sort of assistant devices; and a starting controller configured to control the super capacitor at the time of a start. The starting controller may include a super capacitor relay, an initial charging relay, and an initial charging resistor, the initial charging relay may include a plurality of relays, and the initial charging resistor may include a plurality of resistors.

The initial charging relay may include first and second relays connected to each other in parallel, and the initial charging resistor may include a first resistor serially connected to the first relay and a second resistor serially connected to the second relay.

The first relay and the first resistor may be used for an emergency start.

Another exemplary embodiment provides an emergency starting method of a fuel cell hybrid vehicle, including: turning on ignition of a vehicle; determining whether a starting DC power converter of the vehicle fails; when the starting DC power converter of the vehicle fails, determining whether a remaining voltage of a super capacitor is equal to or greater than a reference voltage; and when the remaining voltage of the super capacitor is equal to or greater than the reference voltage, performing an emergency start by using the super capacitor.

The fuel cell hybrid vehicle may include a super capacitor relay, an initial charging relay, and an initial charging resistor for starting of the vehicle, the initial charging relay may include a plurality of relays, and the initial charging resistor may include a plurality of resistors.

The performing of the emergency start may include: activating a fuel cell by turning on at least one of the plurality of relays to drive a balance-of-plant; when the fuel cell is activated, charging the super capacitor by turning on the plurality of relays; and when the charging of the super capacitor is completed, setting a driving preparation state by turning on the super capacitor relay.

The initial charging relay may include first and second relays connected to each other in parallel, and the initial charging resistor may include a first resistor serially connected to the first relay and a second resistor serially connected to the second relay.

In the activating of the fuel cell, the first relay may remain in an on-state, and the second relay may remain in an off-state, so that the fuel cell may be activated by using the first resistor.

In the activating of the fuel cell, a current may be gradually increased with time.

According to the present exemplary embodiments, when the starting DC power converter has a malfunction, it is possible to perform an emergency start when the remaining voltage of the super capacitor is a reference voltage Ve. Accordingly, even when the starting DC power converter operated at the time of the start fails, it is possible to make the vehicle be in a normal state by performing an emergency start by the super capacitor. Accordingly, it is possible to reduce a time and an expense due to towing, and the like.

DETAILED DESCRIPTION OF THE EMBODIMENTS

Hereinafter, exemplary embodiments of the present disclosure will be described in detail with reference to the accompanying drawings. However, the present invention is not limited to the exemplary embodiments, but may be modified in various forms.

Figure 1:
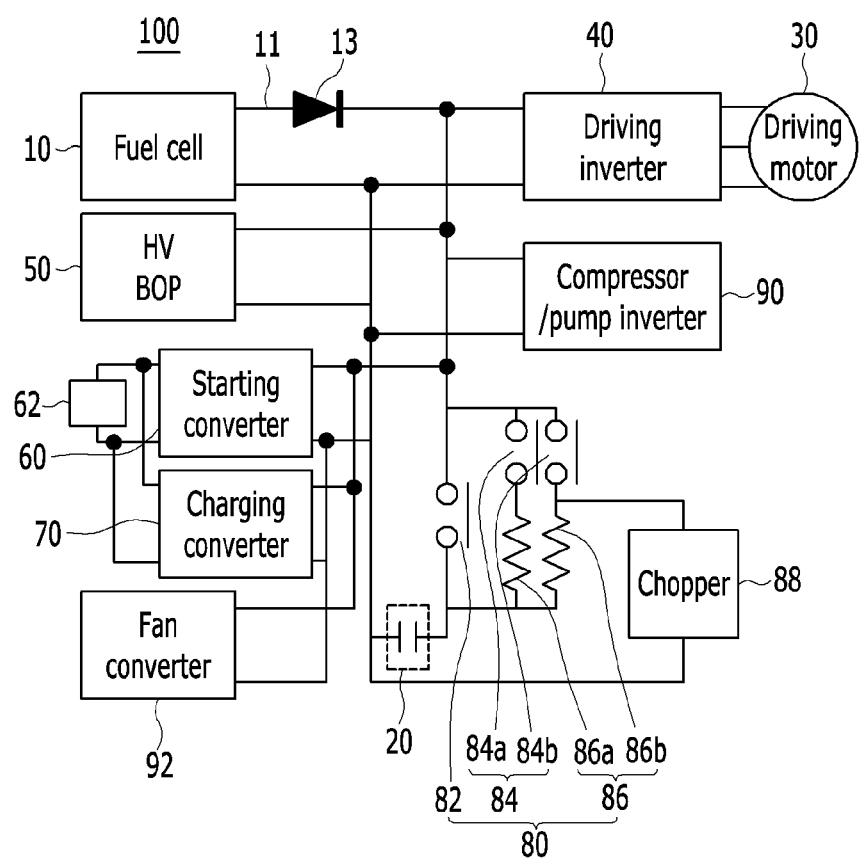
FIG. 1 is a configuration diagram illustrating an emergency starting system of a fuel cell hybrid vehicle according to an exemplary embodiment of the present disclosure.

FIG. 1 is a configuration diagram illustrating an emergency starting system of a fuel cell hybrid vehicle according to an exemplary embodiment of the present disclosure.

Referring to FIG. 1, an emergency starting system 100 of a fuel cell hybrid vehicle according to an exemplary embodiment of the present disclosure may include a fuel cell 10 and a super capacitor 200 connected in parallel through a main bus terminal 11, a driving motor 30, a driving inverter 40 for controlling the driving motor 30, a balance-of-plant (BOP) 50, a starting DC power converter (hereinafter, referred to as a "converter") 60, a charging converter 70, a low-voltage battery 62, and a starting controller 80. In addition, the emergency starting system 100 of the fuel cell hybrid vehicle may further include an inverter 90 for an operation of a compressor and/or pumps, a converter 92 for driving a fan, and the like.

The fuel cell 10 is used as a main power source of the vehicle, and the super capacitor 20 is used as an auxiliary power source. The super capacitor 20, which is an auxiliary energy source capable of performing rapid and high-output charging and discharging, supplements output by the fuel cell 10 and maximizes utilization of regenerative energy, so that the fuel cell 10 may be efficiently used. As described above, when the super capacitor 20 is used as the auxiliary power source, the structure and control of the system 100 may be simplified compared to a case where a high-voltage battery is used. Accordingly, energy efficiency is excellent, thereby improving fuel efficiency.

A reverse blocking diode (RBD) 13 is installed in the main bus terminal 11 in order to prevent a reverse current from flowing to the fuel cell 10.

The driving inverter 40 is connected to the main bus terminal 11, which is an output terminal of the fuel cell 10 and the super capacitor 20 to convert DC power provided from the fuel cell 10 or the super capacitor 20 to AC power to provide the converted AC power to the driving motor 30.

The driving motor 30 is connected to the driving inverter 40 to convert electric energy of the AC power provided from the driving inverter 40 to rotational kinetic energy.

The BOP 50 refers to an air process system (APS), a hydrogen process system (FPS), and the like necessary for driving of the system. Since a system using the fuel cell 10 has no function of naturally suctioning air by a stroke motion of a piston, such as an internal combustion engine, the BOP 50 serves to blow hydrogen and oxygen to open circuit voltage Voc of the fuel cell 10.

The starting converter 60 boosts a voltage of the low-voltage battery 60 to a high voltage with which the BOP 50 may be driven to drive the BOP 50 by using the boosted high voltage. For example, the starting converter 60 may boost 24 V to a high voltage. The starting converter 60 is not driven after the start. The charging converter 70 serves to charge the low-voltage battery 62. Various known structures and methods may be applied to the starting converter 60 and the charging converter 70.

The starting controller 80 discharges and/or charges the super capacitor 20 at the time of an initial start or an emergency start. The starting controller 80 includes a super capacitor relay 82, an initial charging relay 84, and an initial charging resistor 86. Further, the starting controller 80 may further include a chopper 88 for controlling the amount of current when the super capacitor 20 is charged.

The initial charging relay 84 is turn on at the time of the initial start, so that the super capacitor 20 is charged by the initial charging resistor 86. The initial charging relay 84 and the initial charging resistor 86 prevent excessive current from flowing when the super capacitor 20 is charged by using the high-voltage fuel cell 10. Further, the super capacitor relay 82 is turned on when the charging of the super capacitor 20 is completed, to connect the super capacitor 20, which is the auxiliary power source, to the main bus terminal 11.

In this case, in the present exemplary embodiment, the initial charging relay 84 includes first and second relays 84a and 84b, and the initial charging resistor 86 includes first and second resistors 86a and 86b. In this case, the first relay 84a and the first resistor 86a may be connected in series, the second relay 84b and the second resistor 86b may be connected in series, and the first relay 84a and the first resistor 86a, and the second relay 84b and the second resistor 86b may be connected in parallel. The initial charging relay 84 and the initial charging resistor 86 are controlled by a controller (not illustrated) communicating with a superordinate controller serving to control the start.

In the present exemplary embodiment, it is described that the initial charging relay 84 includes the two relays, and the initial charging resistor 86 includes the two resistors as an example, but the present disclosure is not limited thereto. Accordingly, a plurality of initial charging relays 84 may be included, and a plurality of initial charging resistors 86 may be included.

Accordingly, when the starting converter 60 has malfunction, and the remaining voltage of the super capacitor 20 is equal to or greater than a reference voltage Ve, the emergency start may be performed. That is, when the remaining voltage of the super capacitor 20 is equal to or greater than the reference voltage Ve, the first relay 84a is turned on to drive the BOP by using the first resistor 86a. When the fuel cell 10 is activated with a voltage equal to or greater than the voltage of the super capacitor 20, the second relay 84b is turned on, as well as the first relay 84a, to charge energy consumed in the super capacitor 20 by using the first and second resistors 86a and 86b.

As described above, in the present exemplary embodiment, when the starting converter 60 has malfunction, it is possible to perform the emergency start even though the remaining voltage of the super capacitor 20 is the reference voltage Ve. There is a problem in the related art in that it is necessary to tow the vehicle and replace the component even in a case where the starting converter, which is operated only at the time of the start, fails, but the problem in the related art may be solved in the present exemplary embodiment.

Figure 2:
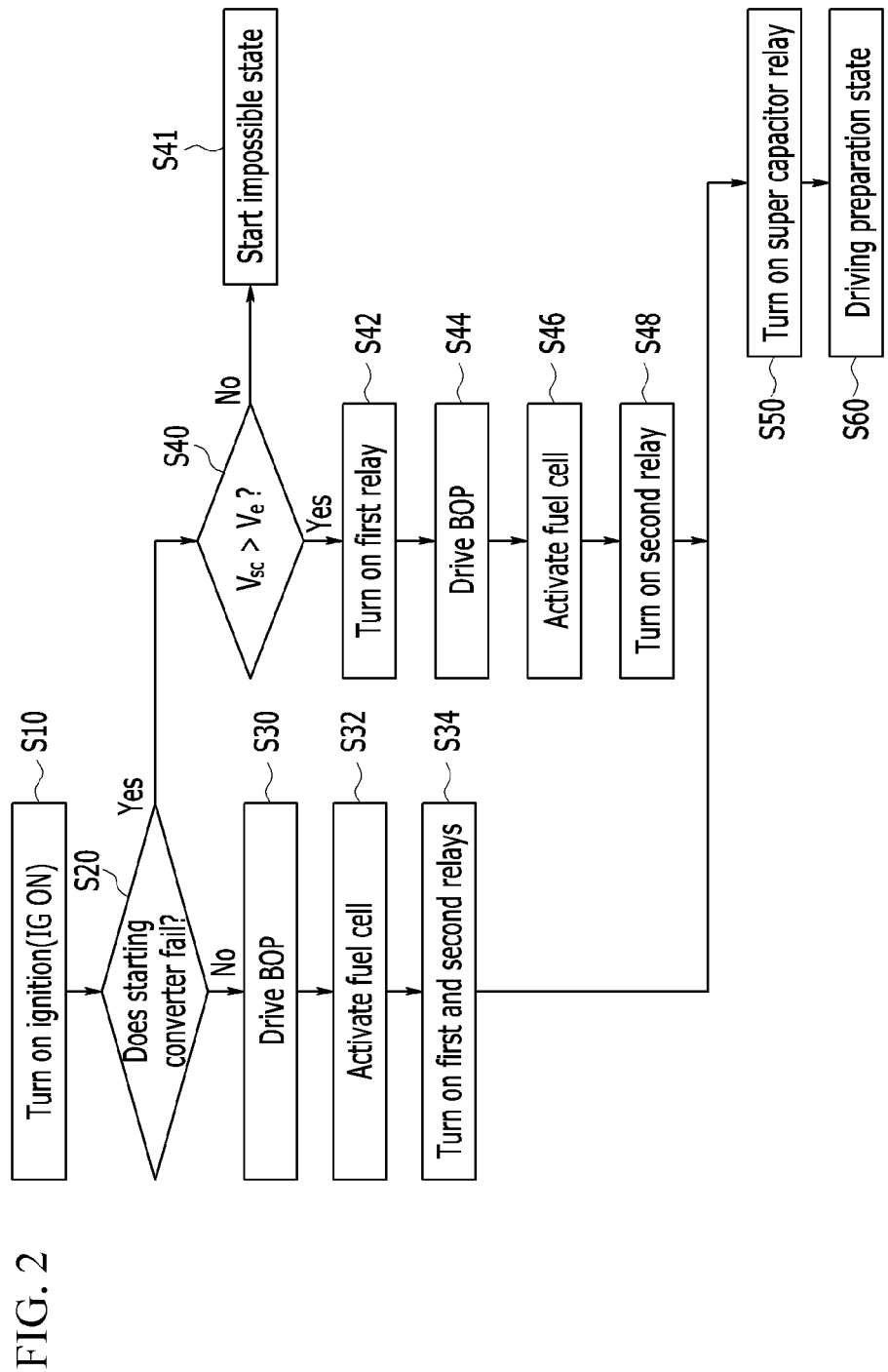
FIG. 2 is a flowchart illustrating an emergency starting method according to an exemplary embodiment of the present disclosure.

Hereinafter, an emergency starting method using the aforementioned emergency starting system 100 of the fuel cell hybrid vehicle will be described in more detail with reference to FIG. 2. FIG. 2 is a flowchart illustrating the emergency starting method according to an exemplary embodiment of the present disclosure.

First, ignition is on (IG on). (S10)

Next, it is determined whether the starting converter fails. (S20)

In this case, when the starting converter 60 does not fail, a voltage is boosted by using the starting converter 60 to drive the BOP 50 (S30), to thereby activate the fuel cell 10. (S32) Further, the first and second relays 84a and 84b are all turned on to charge the super capacitor 20 through the first and second resistors 86a and 86b. (S34)

On the contrary, when the starting converter fails, it is determined whether the remaining voltage Vsc of the super capacitor 20 has the reference voltage Ve required to drive the BOP 50. (S40) Here, the reference voltage Ve is a value obtained by multiplying the amount of current necessary for the driving of the BOP and the first resistor 86a.

In this case, when the remaining voltage Vsc of the super capacitor 20 is smaller than the reference voltage Ve, it is determined that the start is impossible (S41).

Figure 3:
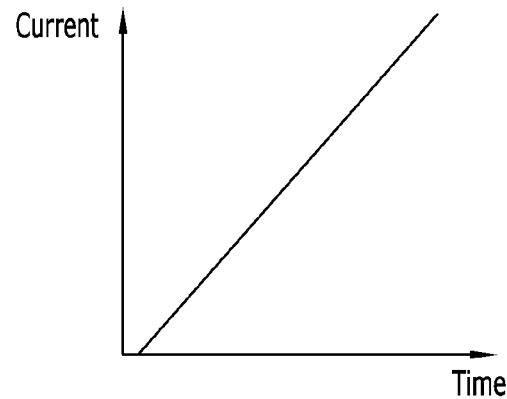
FIG. 3 is a graph illustrating current for driving a BOP with time in the emergency starting method according to the exemplary embodiment of the present disclosure.

On the contrary, when the remaining voltage Vsc of the super capacitor 20 is greater than the reference voltage Ve, the first relay 84a is turned on (S42) to drive the BOP 50 (S44). For example, when the first and second resistors 86a and 86b have the same value, a half of the initial charging current in a normal state is set as a current of the emergency start. However, the present disclosure is not limited thereto. Accordingly, it is possible to design resistance values of the first and second resistors 86a and 86b by calculating power necessary for the BOP 50 in advance. In this case, the BOP 50 serves to supply hydrogen and oxygen up to the open circuit voltage Voc of the fuel cell 10. As illustrated in FIG. 3, the BOP does not draw the excessively large current by gradually increasing the amount of current with time, so that it is possible to gradually draw a load. Accordingly, when the fuel cell 10 is activated (S46), the first and second relays 84a and 84b remain in an on-state (S48). Then, the first and second relays 84a and 84b are all turned-on, so that the super capacitor 20 may be charged through the first and second resistors 86a and 86b.

When the charging of the super capacitor 20 is completed, the super capacitor relay 82 is turned on (S50), so that the super capacitor 20, which is the auxiliary power source, is connected to the main bus terminal 11. Through this, a driving preparation state is completed (S60).

As described above, in the present exemplary embodiment, when the starting converter 60 has malfunction, it is possible to perform the emergency start even when the remaining voltage of the super capacitor 20 is the reference voltage Ve. In the related art, a problem exists that it is necessary to tow the vehicle and replace the component even when the starting converter, operating at the time of the start, fails. The present embodiment resolves the above problem. That is, even though the starting converter fails, the fuel cell is activated and then the super capacitor is charged to convert a mode to a normal driving mode, so that it is possible to perform the emergency start.

The characteristic, the structure, the effect, and the like according to the above description are included in at least one exemplary embodiment, and are not essentially limited to one exemplary embodiment. Further, the characteristic, the structure, and the effect, and the like exemplified in each exemplary embodiment may be implemented through combination or modification for other exemplary embodiments by one skilled in the art to which the exemplary embodiments of the present disclosure pertains. Accordingly, it shall be construed that the contents related to the combination and the modification are included in the scope of the present disclosure.

DESCRIPTION OF SYMBOLS

100: Emergency starting system
10: Fuel cell
20: Super capacitor
80: Starting system
82: Super capacitor relay
84: Initial charging relay
86: Initial charging resistor

What is claimed is:

1. An emergency starting method of a fuel cell hybrid vehicle, comprising steps of:
   turning on ignition of a vehicle;
   determining whether a starting DC power converter of the vehicle fails;
   when the starting DC power converter fails, determining whether a remaining voltage of a super capacitor is equal to or greater than a reference voltage;
   when the remaining voltage of the super capacitor is equal to or greater than the reference voltage, performing an emergency start by using the super capacitor;
   wherein the fuel cell hybrid vehicle includes a super capacitor relay, an initial charging relay, and a resistor for charging the super capacitor at an initial start for starting of the vehicle;
   the initial charging relay includes a plurality of relays, and the initial charging resistor includes a plurality of resistors; and
   the step of performing of the emergency start comprises:
   activating a fuel cell by turning on at least one of the plurality of relays to drive a balance-of plant;
   when the fuel cell is activated, charging the super capacitor by turning on the plurality of relays; and
   when the charging of the super capacitor is completed, setting a driving preparation state by turning on the super capacitor relay.

2. The emergency starting method of claim 1, wherein:
   the initial charging relay includes first and second relays connected to each other in parallel, and
   the resistor for charging the super capacitor at an initial start includes a first resistor serially connected to the first relay and a second resistor serially connected to the second relay.

3. The emergency starting method of claim 2, wherein:
   in the step of activating of the fuel cell, the first relay remains in an on-state, and the second relay remains in an off-state, so that the fuel cell is activated by using the first resistor.

4. The emergency starting method of claim 2, wherein:
   in the step of activating of the fuel cell, a current is gradually increased with time.

* * * * *